United States Patent [19]

Saari

[11] Patent Number: 4,576,057
[45] Date of Patent: Mar. 18, 1986

[54] ANTI-FRICTION NUT/SCREW DRIVE

[75] Inventor: Oliver Saari, Minneapolis, Minn.

[73] Assignee: Illinois Tool Works Inc., Chicago, Ill.

[21] Appl. No.: 620,355

[22] Filed: Jun. 13, 1984

[51] Int. Cl.$^4$ .................. F16H 1/18; F16H 1/20; F16H 27/02; F16H 29/02

[52] U.S. Cl. ................ 74/424.8 C; 74/89.15; 74/424.8 R; 74/441

[58] Field of Search ........... 74/424.8 C, 424.8 R, 74/89.15, 441

[56] References Cited

U.S. PATENT DOCUMENTS

| | | | |
|---|---|---|---|
| 2,938,400 | 5/1960 | Gondek | 74/424.8 R |
| 2,951,390 | 9/1960 | Martens et al. | 74/424.8 R |
| 3,003,362 | 10/1961 | Martens | 74/424.8 R |
| 3,004,445 | 10/1961 | Mondon | 74/441 |
| 3,164,029 | 1/1965 | Martens | 74/424.8 R |
| 3,861,226 | 1/1975 | Stanley | 74/89.15 |
| 3,884,090 | 5/1975 | Dock | 74/441 |
| 3,965,761 | 6/1976 | Stanley | 74/89.15 |
| 4,033,194 | 7/1977 | Stanley | 74/89.15 |
| 4,048,867 | 9/1977 | Saari | 74/424.8 B |
| 4,050,319 | 9/1977 | Stanley | 74/89.15 |
| 4,074,586 | 2/1978 | Nussbaum | 74/424.8 C |

OTHER PUBLICATIONS

"Nomograph Aids Solution of Worm-Thread Profiles", *American Machinist*, pp. 113–116, Oliver Saari, Jul. 5, 1954.

"How to Calculate Exact Wheel Profiles for Form Grinding Helical-Gear Teeth", *American Machinist*, pp. 172–175, Oliver Saari, Sep. 13, 1954.

*Primary Examiner*—Lawrence J. Staab
*Assistant Examiner*—Michael Bednarek
*Attorney, Agent, or Firm*—J. R. Halvossen; A. J. Brunett; T. W. Buckman

[57] ABSTRACT

An improved nut-and-screw type device for converting rotary input to linear output. The device includes an involute-helicoidal screw, a nut assembly including a plurality of annular ring and groove rollers conjugate to said screw; a freely rotating ring having internal grooves conjugate to said roller; and bearing means engaging said rotating ring and the outer housing of said nut assembly thereby providing rolling line contact for transmission of the major forces.

19 Claims, 7 Drawing Figures

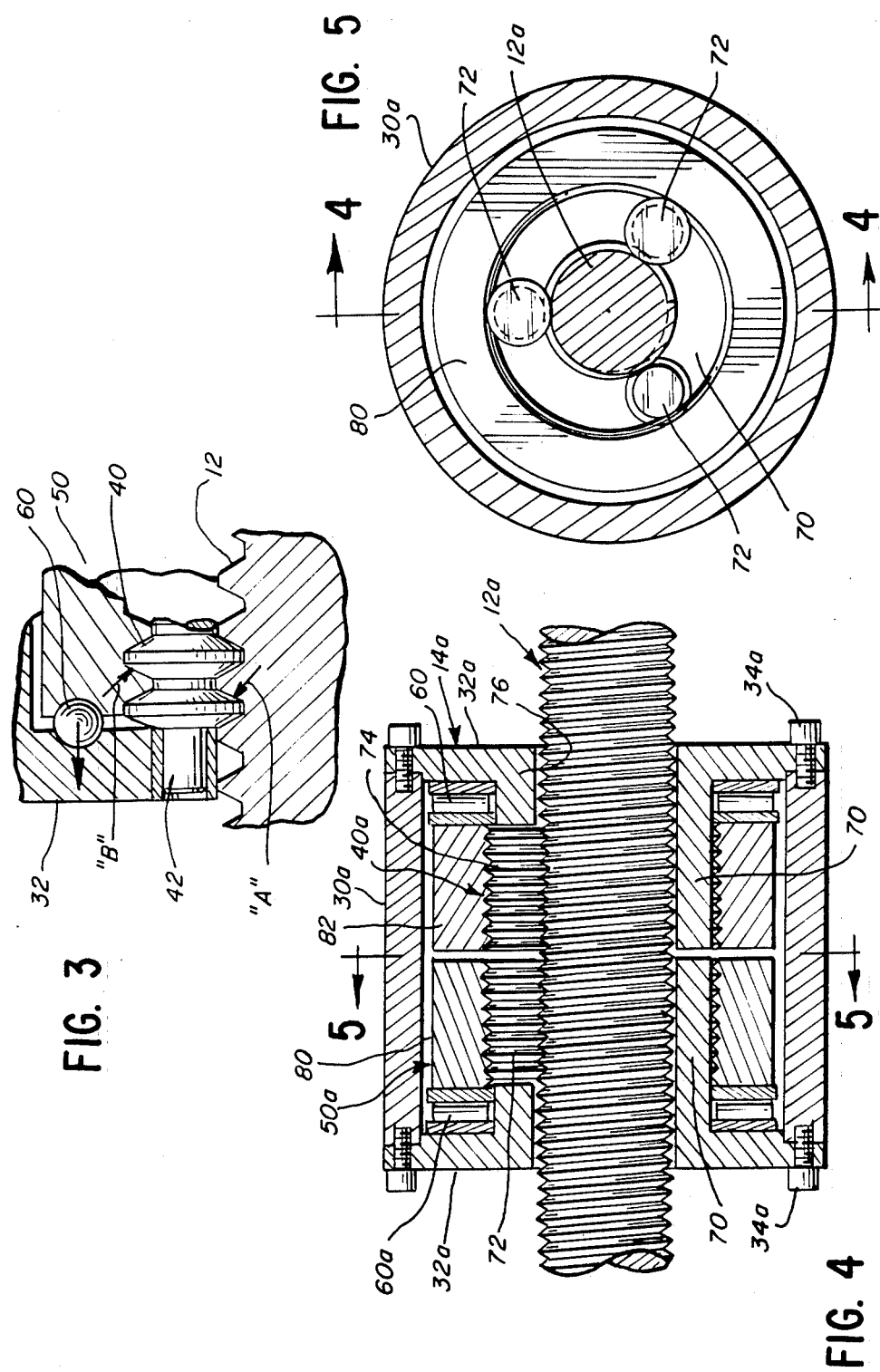

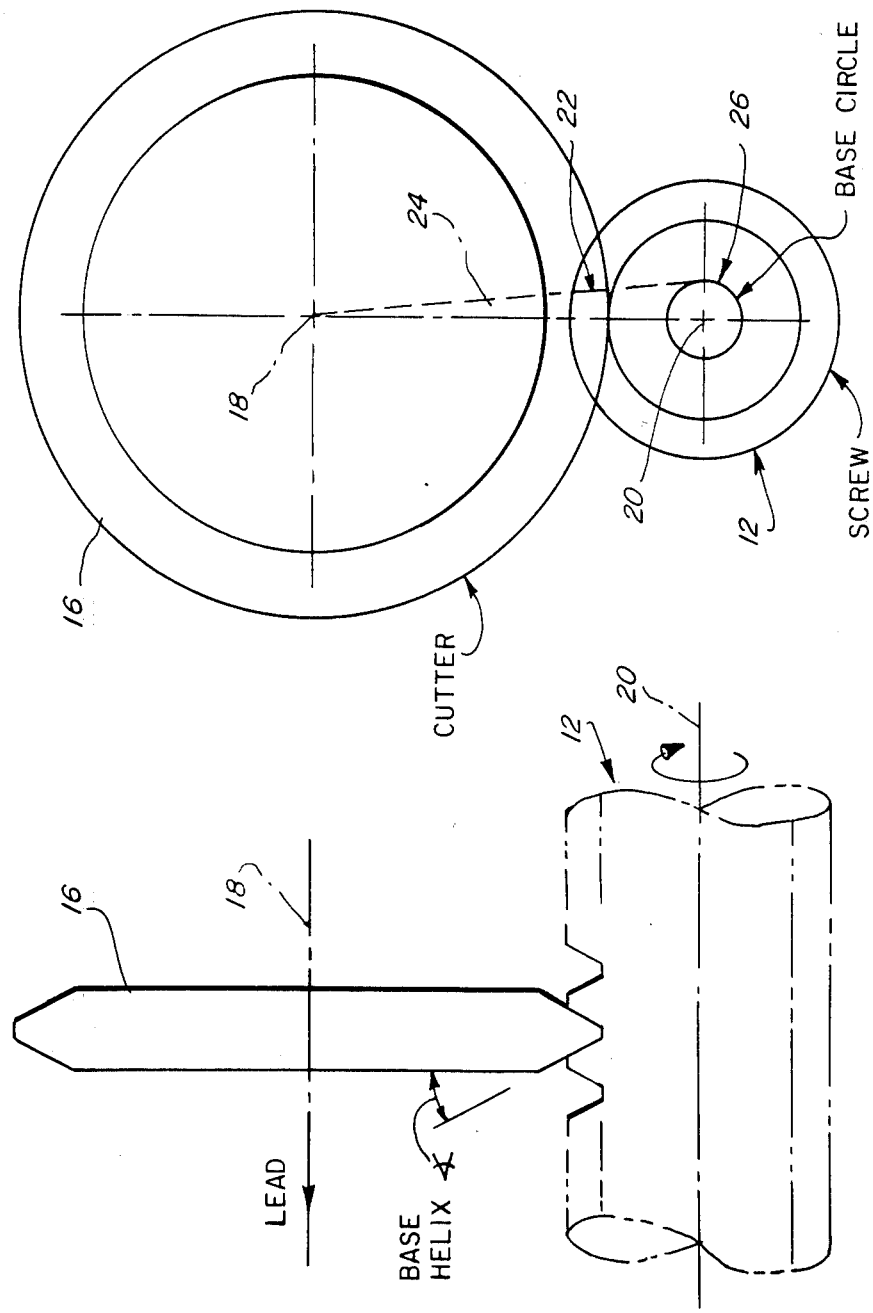

ANTI-FRICTION NUT/SCREW DRIVE

This invention relates to an improved mechanical device for converting rotary input to linear ouput, and more particularly to an improved nut-and-screw type mechanism.

BACKGROUND OF THE INVENTION

The ordinary screw-nut combination is very inefficient due to the fact that the sliding surfaces are subject to output loads which result in large friction loses. Various devices have been used to reduce the friction such as the ball-nut, roller-nut, etc. The present invention is related to a device that is intended to perform the same function but more simply, more efficiently, and at lower cost.

Broadly, some current devices include a threaded shaft unit and a nut unit. The nut unit commonly comprises an assembly having an outer case that houses anti-friction elements engaging the threaded shaft or screw and normally surrounds it for load distribution purposes. Devices of this type can broadly be found in U.S. patent classification class 74-424.8 and class 74-89.15. For example, the U.S. Pat. No. 3,003,362 to Martens uses a toroidal shaped bearing element in engagement with a normal screw, but, such combinations of toroidal shapes engaging normal screw threads do not permit large forces to be transmitted. Martens also uses pintles at the end of the shafts carrying the toroidal shape for force transmission to a cage. The diminutive and weak form of the pintles limit the forces that are transmittable from the screw through the cage to the housing plus high stress and friction concentration. And lastly he utilizes a freely rotatable ring that merely holds the bearing elements in rolling contact with the screw threads and has no load bearing function whatsoever.

The earlier U.S. Pat. No. 4,048,867, to Saari, the present inventor, included three basic members a screw, rollers and a ring forming the housing. Rotation of the screw caused a planetary motion of the rollers resulting in a linear translation of the ring. This simple device for converting torque to linear force had one draw back, namely, due to the planetary motion of the rollers, the nut did not move at the same rate in direct relationship with the lead of the screw but, rather, at a lesser rate. Moreover, repetition of position after a number of cycles of motion and load reversals was not assured. Where accuracey and repetitiveness of position was not desired the device was adequate, however, where it was desired to repeat a position the device did not function adequately. The present device overcomes these defects.

Additionally, the U.S. Pat. No. 2,488,356 to Anderson, and the two U.S. Pat. Nos. 3,965,761 and 4,033,194 to Stanley show anti-friction devices that make use of the end face of rollers and frusto-conical surfaces on the rollers and cages for transmission of axial and radial forces from the screw through the rollers to the housing. As will be appreciated such devices are inefficient and limited in their load bearing capabilities.

SUMMARY OF THE INVENTION

Broadly it is an object of the present invention to overcome the deficiencies displayed in the prior art devices and to fabricate a simple device capable of transmitting large forces with a minimum of loss in efficiency.

The present device includes a screw engaged by a multiplicity of rollers which have annular rings and grooves conjugate to the threads of the screw. The rings and grooves of the rollers are also meshed with internal annular rings and grooves on an encircling ring which is free to rotate within the assembly. The ring is held concentric by the symmetrical distribution of the rollers which engage it. Linear motion of the ring is prevented by a fixed outer nut assembly or housing which engages the ring through anti-friction bearings. The outer nut assembly also engages and locates the small rollers either through stub shafts or other means (such as slots) to prevent their planetary motion. The rollers are in equilibrium between the screw and the ring and need no other support except for the relatively small tangential forces resulting from the input driving torque. All the large axial forces are transmitted through substantially rolling contact, from the screw to the rollers, from the rollers to the ring, and from the ring through the bearing means to the outer housing for connection to the workpiece. The only coulomb friction within the device occurs tangentially at the stub shafts or pintles and these are only subject to input forces which are of a minimal magnitude.

It is a further object of the invention to provide an improved motion-transmitting device in which the axially moveable element, be it the screw or nut assembly, is advanced or returned a predetermined amount per revolution of the rotatable element so that accuracy and repetitiveness of position are attained.

It is a further object of the invention to provide an improved motion-transmitting device comprised of a few simple, practical, and dependable parts which can be duplicated and combined to produce a quiet inexpensive smooth operating device.

Still another object of the present invention is to utilize an involute-helicoidal screw that can be made on a standard thread-milling (or thread-grinding) machinw geared to provide the desired lead, and in which the cutter (or grinding wheel) has a frusto-conical shape whose pressure angle is equal to the base helix angle of the involute-helicoid being generated. The pressure angle of the cutter, the pressure angle of the frusto-conical rollers of the nut device are conjugate and equal to the base helix angle of the involute-helicoid screw thereby providing line contact to ensure greater transmission of forces.

It is a further object of the present invention to provide a motion transmitting mechanism which can be adjusted to eliminate backlash and to instill a predetermined degree of preload between the screw and rollers of the nut assembly.

Additional objects and features of the invention will become evident when the following description is considered in conjunction with the accompanying drawings.

DETAILED DESCRIPTION OF THE DRAWINGS

FIG. 3 is a fragmentary enlarged view of a force and thrust transmission diagram of the present invention;

FIG. 4 is an elevational view in partial section, taken along line 4—4 of FIG. 5, showing a second embodiment of the present invention;

FIG. 5 is a sectional view taken along line 5—5 of FIG. 4;

FIG. 6 is schematic elevation of a screw and a cutter of the type used in the present invention; and FIG. 7 is an end schematic view of the cutter and screw shown in FIG. 6.

DETAILED DESCRIPTION OF THE INVENTION

Figure 2:
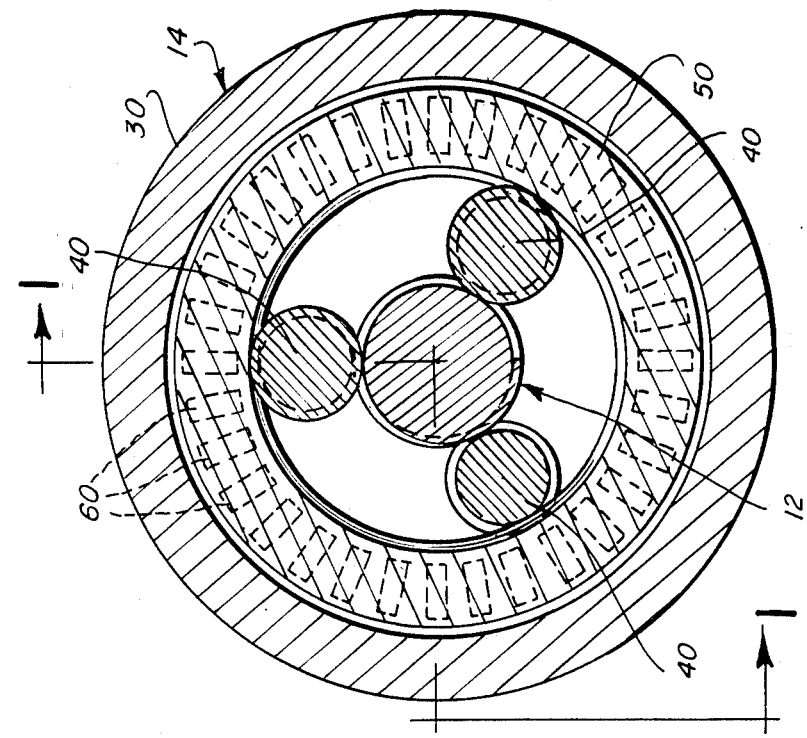
FIG. 2 is an end view in partial section taken along line 2—2 in FIG. 1.
Figure 1:
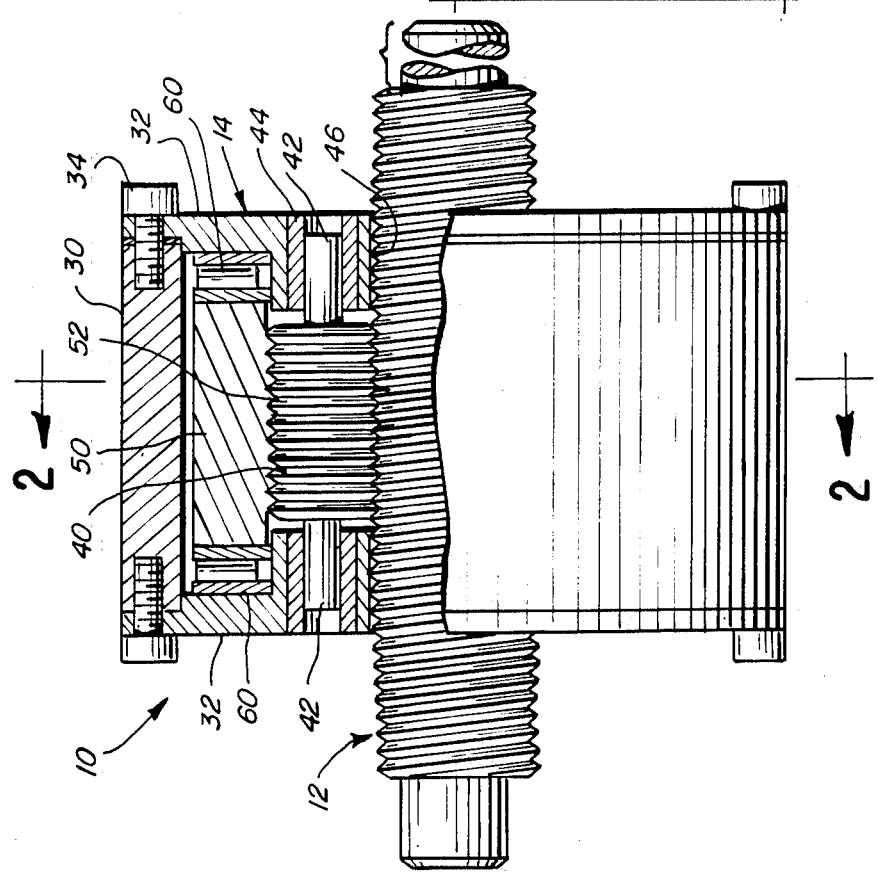
FIG. 1 is an elevational view in partial section of the present invention taken along line 1—1 of FIG. 2.

Referring initially to FIGS. 1 and 2 of the drawings, a motion transmission device 10 contemplated by the present invention includes an involute-helicoidal screw 12 passing through, supporting, and threadedly engaging a nut assembly generally designated 14. A shaft 12 may be driven by any suitable power unit that is reversible (not shown) and the nut assembly 14 may be connected to a work load, carriage, or the like, to be moved along the axis of the shaft. Alternatively the nut assembly 14 may be axially fixed but rotated under power and the shaft 12 moved axially relatively thereto and may be connected to the work load, carriage or the like.

Preferably, the shaft 12 is of the multiple lead or thread type. In this particular instance the preferred variety is a three lead thread of the right hand type but may be left or right handed as is best suited to a particular situation. Obviously there may be any desired number of threads on the shaft. A preferred form for such a screw thread on the shaft is that of an involute-helicoidal screw. Referring to FIGS. 6 and 7, the screw blank 12 and cutter (or grinding wheel) 16 are mounted in a standard thread-milling (or thread-grinding) machine geared to provide the desired lead. The axis 18 of the cutter 16 is set parallel to the axis 20 of the screw blank 12. The cutter 16 has a frusto-conical shape whose pressure angle is equal to the base helix angle of the involute-helicoid being generated. It can be shown mathematically that the finishing contact line 22 (a straight line) is located in a plane 24 containing the axis 18 of the cutter 16 and which is also tangent to the base circle 26 of the screw. In effect, the involute-helicoidal screw form is generated by the straight line segment 22.

From the foregoing it is evident that the form of the screw depends only on the lead value and the pressure angle of the cutter, not on its size. Thus, a screw which is generated by a large cutter (or grinding wheel) will be conjugate, with line contact, with the smaller frusto-conical rollers of the nut device, provided only that the pressure angles of the rollers are the same as those of the cutter.

This method of machining the screw lends itself well to forming multiple threads on the screw in a single pass, without indexing, since the cutter can have a multiplicity of forms equal in number to the number of starts desired on the screw (not shown).

Referring back now to FIGS. 1 and 2, the nut assembly 14 includes an outer housing having a cylindrical shell 30 and a pair of end walls 32 suitably affixed to the shell 30 as by the bolts 34. It will be appreciated that, in a practical application of this device, means such as flanges or trunions would be included for association of the housing with the workpiece, carriage or the like. As was previously indicated, the screw 12 in the illustrated embodiment has three leads and hence the nut assembly includes three rollers 40 symmetrically disposed in circumferentially spaced relation around the screw 12. The rollers 40 have annular grooves and ridges and are conjugate to the screw threads 12. At either end, in this embodiment, the rollers 40 are provided with a stub shaft or pintle 42 which is located within suitable anti-friction bearing means 44 positioned within a boss 46 supported by the end wall 32 of the housing.

Encircling the rollers 40 is a continuous ring 50 having internal grooves 52 that are conjugate to the ridges and grooves of roller 40. Adjacent the end surfaces, in this embodiment, of the ring 50 there are provided suitable anti-friction bearing means such as ball bearings, roller bearings or tapered roller bearings 60 which transmit the forces that pass from the screw 12 to the annular roller 40 and the conjugate teeth 52 of the ring 50, thence through the bearings 60 into the housing 14. The outer nut assembly which engages the stub shafts 42, by means such as the bearing 44 may also utilize circumferentially disposed slots to permit slight movement of the rollers 40, but generally to prevent their planetary motion. It will be noted that the rollers are in equilibrium between the screw and the ring and need no other support. It is evident that this device has a lead characteristic exactly equal to the lead screw since the ring is prevented from axial motion by the fixed outer nut assembly that engages it through the anti-friction bearings 60.

As best seen in FIG. 3, the force distributions within this device are as follows:

The small rollers 40 are at all times in force-equilibrium between the screw 12 and the ring 50 except for the relatively small tangential forces resulting from the input driving torque. All the large axial forces are transmitted through substantially rolling contact, from the screw to the rollers (see force arrow "A"), from the rollers to the ring, and from the ring (see force arrow "B") through the bearings to the outer housing (see the arrow extending from ball bearing 60 into end wall 32). The only coulomb friction within the device occurs at the stub shafts or pintles 42 and these are subject only to the input forces, which are of generally very small magnitude. The forces are evenly distributed since substantially all of the teeth (rings and grooves) of each roller are engaged by both the screw 12 and ring 50.

A second embodiment of the invention can be found in FIGS. 4 and 5 wherein similar numerals are used for similar parts with the addition of the suffix "a". the threaded shaft 12a is a multiple lead thread, in the present instance three leads, substantially identical to that utilized in the first embodiment. The nut assembly 14a includes an outer cylindrical shell 30a and a pair of end walls 32a having axially extending portions 70 which serve to form pockets for retention of the roller elements. In this instance the roller 40a is split into two axially spaced portions 72 and 74. The end wall 32a also includes additional axial extensions such as a shorter portion or pressure means 76 which limits the axial movement of the rollers while the semi-circular extension 70 symmetrically locate the shorter roller portions 72 and 74. The ring 50a is also divided into two portions 80 and 82 which are generally equal in axial extent to the roller portions 72 and 74 and with their outboard axial extremities bearing against anti-friction devices 60a that bear against the end walls 32a of the housing. A physical arrangement such as just described is a modification of the first embodiment primarily for purposes to eliminate backlash as well as providing any desired degree of preload between the annular rollers 72–74 and the screw 12a.

As before, the rollers in the ring each have annular grooves and forces are transmitted to the outer nut housing through anti-friction bearings. However, when compared with the first embodiment, the second embodiment has two rings and two sets of rollers contained in pockets extending from the end plates symmetrically to the middle. The end plates are tied together with the outer housing 30a in a way that permits a small relative angular displacement of one with respect to the other. For example, in the first embodiment the screw members 34 were used to retain the end plates 32 relative to the cylindrical shell 30a. In this embodiment the end wall 32a can be provided with a circumferentially disposed slot through which the screw 34a would be positioned and thereby permit angular rotation of one wall 32a with respect to the opposite end wall. It is evident that if this displacement is made in a direction that tends to separate the two halves along the screw thread, i.e. movement of the annular roller 72, 74 and their respective rings 80, 82 that the rollers 72 and 74 will be moved apart from one another into rigid engagement with a thread form of the screw 12a. In this way all backlash can be eliminated and any desired degree of preload can be applied. The bolts or screws 34a can then be tightened and retained in this fashion.

Moreover, if the ring portions 80–82 are made suitably thin in a radial direction they will flex slightly in the radial direction, thus compensating for wear and preventing binding, while still retaining their stiffness in the axial direction to carry the loads required.

Thus, in the present invention applicant has disclosed a simple device which can be readily replicated, made in a variety of sizes by interchangeability of parts so that as long as the rollers are conjugate with the screw, have the same pressure angle as those of the cutter that make the screw and have the same pressure angle as the rings, then the rollers will be conjugate with involute-helicoidal screw and can be adapted to accept small rollers, large rollers and intermediate size rollers with an appropriate diameter of annular grooved rings. Installation of the appropriate thrust bearings to accept the axially directed load ensures that virtually all of the forces being transmitted are of a rolling nature where the screw forces are passed to the rollers, from the rollers to the ring and from the ring through the thrust bearing means to the housing. Little or no frictional losses are incurred by the locating means that retain the rollers in a substantially equilibrium position and hence a very efficient device is produced. Since virtually all of the grooves of the rollers are engaged with the screw and all of the grooves of the rollers are engaged by the ring, the forces are distributed throughout the entire length of the roller rather than at intermittent points. The use of the involute-helicoidal screw and the frusto-conical cross-sectional form of the tooth and groove in the rollers and ring produce a line contact which is amenable to a full force transmission rather than the point contact for transmittal of forces found in so much of the prior art. It is felt that other variations of the described embodiments will be apparent to those skilled in the art and the nut assembly should be construed as being capable of being built into slides, housings, or the like or suitable fastening means attached to the nut assembly housing for association with the workpiece (not shown).

I claim:

1. An improved anti-friction screw-nut device including a nut assembly, a threaded screw having a plurality of leads extending through said nut assembly, said nut assembly including housing means, a plurality of elongate rollers equal in number to the number of leads on said screw, each of said rollers having a plurality of annular grooves forming a plurality of annular ring-like teeth conjugate to the threads of said screw, means cooperatingly locating said rollers in circumferentially spaced relation to said nut assembly and said screw, a freely rotatable ring having annular grooves for engaging and retaining said rollers in radial engagement with said screw, said ring being positioned intermediate the length of said rollers and having a width selected to provide sufficient contact between it and said rollers at a position intermediate the length of said rollers to distribute thrust over a selected area, and bearing means for transmitting thrust from said ring to said nut assembly.

2. An improved anti-friction screw-nut device as claimed in claim 1 wherein said annular roller grooves have no lead.

3. An improved anti-friction screw-nut device as claimed in claim 2 wherein said annular grooves engage said screw throughout substantially the entire length of said roller.

4. An improved anti-friction screw-nut device as claimed in claim 3 wherein said annular grooves in said ring have no lead.

5. An improved anti-friction screw-nut device as claimed in claim 4 wherein said rotatable ring grooves engage the same number of roller teeth as engage the screw, thereby widely distributing the thrust throughout substantially the entire roller.

6. An improved anti-friction screw-nut device as claimed in claim 1 wherein said screw has an involute helicoid shape.

7. An improved anti-friction screw-nut device as claimed in claim 6 wherein said screw base helix angle, the pressure angle of the cutter used to form same and the pressure angle of said roller are all substantially equal.

8. An improved anti-friction screw-nut device as claimed in claim 1 wherein said screw has at least three leads and said nut assembly has an equal number of rollers.

9. An improved anti-friction screw-nut device as claimed in claim 1 wherein said means cooperatively locating said rollers includes engagement by said nut assembly outer housing means with stub-shafts or the like carried by said rollers to prevent their planetary motion, said housing means including at each of its ends a plurality of cavities circumferentially spaced about and radially spaced from the axis of said screw, each of said cavities adapted to accept a stub shaft extending from the end of a roller.

10. An improved anti-friction screw-nut device as claimed in claim 9 wherein each of said bores is formed as an arc-like slot to cooperatively accept one of said stub-shafts, said slots adapted to permit limited circumferential movement of said stub-shafts.

11. An anti-friction force transmission device for conversion of rotary motion to linear motion including a multiple lead screw, a nut assembly having a plurality of no-lead elongate rollers with annular grooves, said rollers being equal in number to the number of leads on said screw and each being conjugate to the screw, a freely rotatable ring having internal grooves with no lead encircling and retaining said rollers relative to said screw, said ring having a predetermined substantial width with the center of said width being positioned intermediate the ends of said rollers, said width selected to provide sufficient contact between said ring and said rollers at a position intermediate the ends of said rollers to thereby distribute thrust over a substantial area, and housing means for completing said nut assembly and means accepting the thrust exerted by said ring and transmitting said thrust into said housing means.

12. An anti-friction force transmission device of the type claimed in claim 11 wherein said screw is rotated and said nut assembly is moved linearly.

13. An anti-friction force transmission device of the type claimed in claim 11 wherein said housing means is rotated and said screw is moved linearly.

14. An anti-friction force transmission device of the type claimed in claim 11 wherein said screw threads are involute helicoidal and each of its threads has a straight line section.

15. An anti-friction force transmission device of the type claimed in claim 14 wherein said rollers have a straight sided frusto-conical pitch angle to insure substantially line contact between said roller and said involute helicoidal screw.

16. An anti-friction force transmission device of the type claimed in claim 11 wherein said housing means and said rollers include means for maintaining the ends of said rollers in circumferentially spaced relation about said screw with each roller being in substantially parallel relation to said screw.

17. An anti-friction force transmission device of the type claimed in claim 11 wherein said ring is split at an intermediate plane along its length to provide a pair of freely rotatable rings, said rollers each being separated into two axially spaced portions equivalent to and engaged by said pair of rings, said housing including means forming symmetrical pockets for retention of said rollers and rings, said device including a pair of spaced end walls journaled to accept said screw, rings, rollers and means interconnecting said end walls in generally parallel axially fixed relation but permitting slight angular rotation relative to one another whereby said two portions of each of said rollers will be separated along said screw to eliminate backlash and a predetermined degree of preload applied.

18. An anti-friction force transmission device of the type claimed in claim 17 wherein means are provided for retaining said end walls in said predetermined angular relationship.

19. An anti-friction force transmission device of the type claimed in claim 18 wherein said rollers are relatively thin in radial thickness and thereby capable of flexure in a radial direction to compensate for wear and prevent binding but having adequate stiffness in an axial direction to carry a predetermined load.

* * * * *